US012153327B2

(12) United States Patent
Griggs

(10) Patent No.: US 12,153,327 B2
(45) Date of Patent: Nov. 26, 2024

(54) BAYONET ACCESSORY RING LIGHT

(71) Applicant: GoPro, Inc., San Mateo, CA (US)

(72) Inventor: Ian Copeland Griggs, San Francisco, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 18/233,139

(22) Filed: Aug. 11, 2023

(65) Prior Publication Data

US 2024/0069414 A1 Feb. 29, 2024

Related U.S. Application Data

(60) Provisional application No. 63/400,196, filed on Aug. 23, 2022.

(51) Int. Cl.
*G03B 15/02* (2021.01)

(52) U.S. Cl.
CPC ...... *G03B 15/02* (2013.01); *G03B 2215/0517* (2013.01); *G03B 2215/0575* (2013.01)

(58) Field of Classification Search
CPC  G03B 15/02; G03B 15/03; G03B 2215/0575; G03B 2215/0517; F21Y 2105/18; F21V 17/14
See application file for complete search history.

(56) References Cited

U.S. PATENT DOCUMENTS

| | | | | |
|---|---|---|---|---|
| 1,960,114 | A * | 5/1934 | MacHenry | G02B 25/02 359/802 |
| 2,747,459 | A * | 5/1956 | Morrison | G03B 27/542 355/70 |
| 4,068,245 | A * | 1/1978 | Ohtaki | G03B 9/70 396/61 |
| 4,866,285 | A * | 9/1989 | Simms | G03B 15/05 430/494 |
| 4,987,433 | A * | 1/1991 | Gandrud | G03B 15/05 396/190 |
| 5,010,412 | A * | 4/1991 | Garriss | H04N 23/56 348/E5.029 |
| 5,294,948 | A * | 3/1994 | Merkt | G03B 17/12 396/14 |
| 5,873,647 | A * | 2/1999 | Kurtz | B05B 15/00 362/101 |
| 6,322,226 | B1 * | 11/2001 | Dickson | G02B 27/025 362/253 |
| 6,404,984 | B1 * | 6/2002 | Parvulescu | A61B 1/0605 348/66 |
| 6,663,260 | B1 * | 12/2003 | Tieszen | G01N 21/8806 362/249.02 |
| 7,331,681 | B2 * | 2/2008 | Pohlert | G03B 15/05 362/17 |
| 7,344,273 | B2 * | 3/2008 | Lewis | G01N 21/8806 362/800 |

(Continued)

*Primary Examiner* — Ismael Negron
(74) *Attorney, Agent, or Firm* — Young Basile Hanlon & MacFarlane, P.C.

(57) ABSTRACT

The lens attachment includes a body that overlays a lens of an image capture device and one or more lights integrated with the body that emits light in a direction so that the light is not directed into the lens of the image capture device. The lens attachment includes a connector integrated with the body that secures the lens attachment against a housing of the image capture device.

20 Claims, 5 Drawing Sheets

(56) References Cited

U.S. PATENT DOCUMENTS

| | | | |
|---|---|---|---|
| 8,139,934 B2 * | 3/2012 | Huang | G03B 15/05 |
| | | | 396/199 |
| 8,342,710 B2 * | 1/2013 | Rahbar-Dehghan | G02B 25/02 |
| | | | 362/249.02 |
| 9,366,943 B2 * | 6/2016 | Tenmyo | G03B 15/05 |
| 9,411,212 B2 * | 8/2016 | Ishii | G03B 15/05 |
| 10,168,022 B2 * | 1/2019 | Sun | G03B 15/02 |
| 10,474,006 B2 * | 11/2019 | Ariav | G03B 15/06 |
| 11,585,514 B2 * | 2/2023 | Liu | G03B 15/05 |
| 11,595,556 B2 * | 2/2023 | Shen | H04N 23/695 |

* cited by examiner

BAYONET ACCESSORY RING LIGHT

CROSS-REFERENCE TO RELATED APPLICATION(S)

This application claims priority to and the benefit of U.S. Provisional Patent Application No. 63/400,196, filed Aug. 23, 2022, the entire disclosure of which is hereby incorporated by reference.

TECHNICAL FIELD

This disclosure relates to a lens attachment for an image capture device that provides lighting to images when attached at or adjacent to the lens of an image capture device.

BACKGROUND

Image capture devices are widely used for blogging, social media, modeling, and the like to detect images or videos for posting in some medium. These images or videos are often taken by the user of the image capture device in low light settings so that various colors and contrasts can be utilized by controlled lighting or flashes. However, controlling the light can be difficult if not done precisely, and undesirable shadows can be shown in the images and/or videos. Accordingly, there is a need to provide lighting while detecting images such that undesirable shadows are not cast within the landscape of the image or video.

SUMMARY

Disclosed herein is a lens attachment. The lens attachment includes a body that overlays a lens of an image capture device and one or more lights integrated with the body that emits light in a direction so that the light is not directed into the lens of the image capture device. The lens attachment includes a connector integrated with the body that secures the lens attachment against a housing of the image capture device.

The connector can rotatably connected to a bayonet of the lens of the image capture device. The connector may have a friction fit with the lens of the image capture device. The one or more lights may have a structure of a ring light that is positioned to surround a periphery edge of the lens of the image capture device when the lens attachment is secured to the housing of the image capture device. The lens attachment may further have an external lens that is integrated with the body that overlays the lens of the image capture device. The one or more lights may be slidably connected with the body of the lens attachment so that a different collection of lights is interchangeable with the one or more lights. The one or more lights may emit individual lights in a predetermined pattern so that shadows are avoided when light is detected by an imaging sensor of the image capture device and/or so that color effects highlight portions of a face of a person in the predetermined pattern. The one or more lights may emit a light at an angle of about 15 degrees to about 180 degrees relative to the lens of the image capture device so that shadows are avoided when light is detected by an imaging sensor of the image capture device. The one or more lights may include one or more light directors that direct the light in a controlled direction so that shadows are avoided when light is detected by an imaging sensor of the image capture device and/or so that distinct color separation is shown on a face of a person.

Disclosed herein is an implementation of an image camera device. The image capture device includes a housing; a bayonet integrated with the housing; a lens positioned within the bayonet and over an imaging sensor; and a lens attachment that overlays the lens and the housing. The lens attachment includes a body and a collection of lights connected with the body that emit in a direction that does not interfere with the imaging sensor and/or lens. The lens attachment includes a connector that secures the lens attachment with the bayonet.

The connector may have a rotatable connection with the bayonet or a snap-fit with the bayonet. The body may have a first portion that extends across a first surface of the housing and a second portion that extends across a second surface of the housing, and the first and second portions may be generally perpendicular relative to each other. The body may include a storage unit integrated with the second portion, and the second portion may house one or more internal components that interact with the collection of lights. The collection of lights may be integrated with the first portion. The housing may provide power to the lens attachment. The lens attachment may further include a battery or outlet to an external power source at the second portion that provides power to the collection of lights.

Disclosed herein are implementations of a ring light. The ring light includes a body having first and second portions that are angled relative to each other and a lens integrated into the body at the first portion. The ring light includes a plurality of lights arranged around a periphery of the lens that emit light in a direction away from the lens.

The ring light may further include a battery integrated with the second portion of the body. The ring light may further include an outlet that provides power to the ring light from an image capture device or an external power source through the second portion of the body. The ring light may further include a connector that connects the ring light with a lens of an image capture device so that shadows are minimized during the image detection through the lens of the ring light and the lens of the image capture device. The ring light may further include a connector that rotatably connects the ring light with a bayonet of the image capture device so that the lens of the ring light overlays the lens of the image capture device.

The first and second portions may be generally perpendicular relative to each other so that the body is rotatable at the connector from a first surface of an image capture device, around an edge of the image capture device, and to a second surface of the image capture device. The body may include a controller, a GPS unit, a bluetooth interface, WiFi unit, color sensor, time of flight sensor, microcontroller, supercapacitor for flash, USB connector, on/off button or switch, or any combination thereof that is positioned within the second portion.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A lens attachment for an image capture device can improve lighting during detection of a video or an image. For example, when a user is attempting to detect a video or image with desired contrasts, the user may desire to have constant light rather than a flash or the like. Instead of deploying lamp posts and spotlights, the lens attachment is used to direct light to the user in an efficiently and desired pattern. When the user wants to have multiple light colors or shades directed at his or her face, the user can use a lens attachment that has a ring configuration so that light is deployed around a lens of the image capture device in a color, pattern, and/or brightness that provides detection of an image or video in the desired fashion. In other examples, where the user is taking a video and wants various configurations of light color, brightness, and patterns, the lens attachment can be configured to emit light in such a patterned arrangement that changes during the detection of the images and/or video. Additionally, the lens attachment can be used to adjust the lighting in relation to any natural light that may be changing as the video is detected.

Because the lens attachment is rotatably affixed to the lens of the image capture device, the user can quickly attach or detach the lens attachment at a moment's notice, such as when the user is in a room and then quickly desires to participate in an outdoor activity that does not utilize the lens attachment of the present disclosure. When using the rotatable feature of the lens attachment, the user can also quickly change between different types of lights, such as a cold shoe light that is positioned on a top, bottom, and/or side of the lens or a ring light, so that different types of images and/or videos can be capture depending on the desires of the user. For example, when a user captures an image or video during a blogging session and determines that the lighting is undesirable for the desired artistic outcome with either of the cold-shoe or ring lights, the user can quickly switch to the other of the cold-shoe or the right light to get more desirable lighting in that particular room. With this configuration, an easy comparison of different lights is possible without rearranging multiple spotlights or lamps.

Figure 1A:
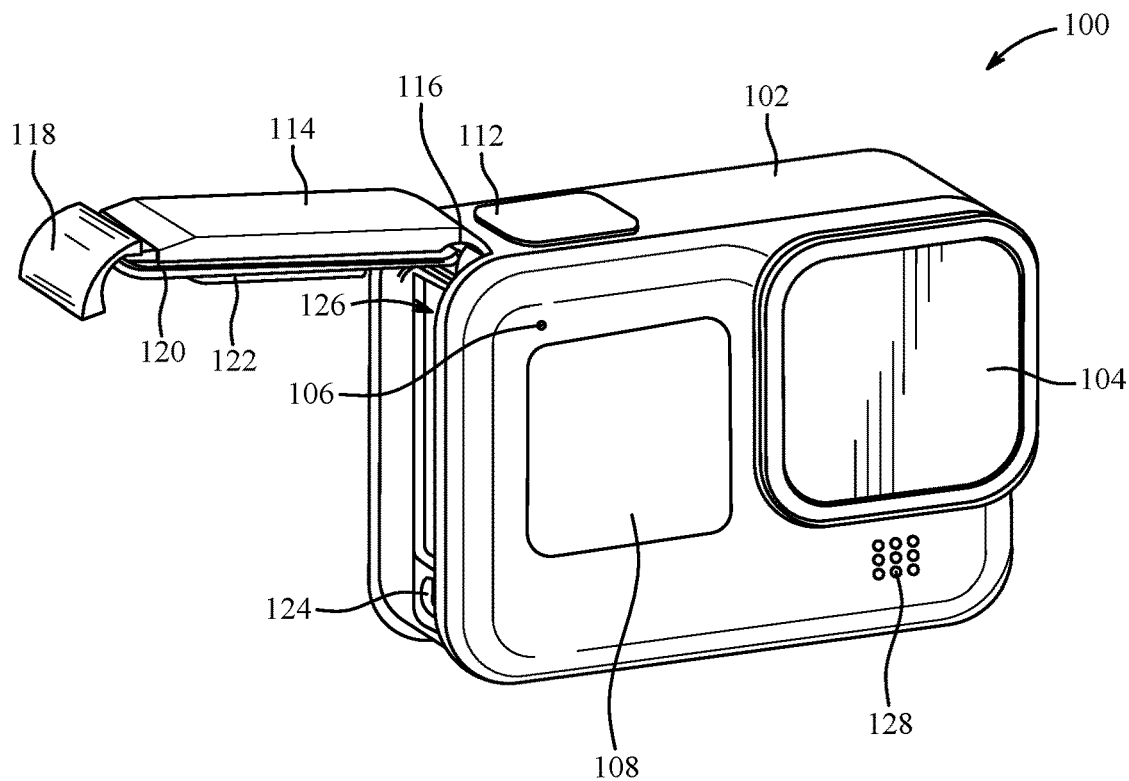
FIGS. 1A-B are isometric views of an example of an image capture device.
Figure 1B:
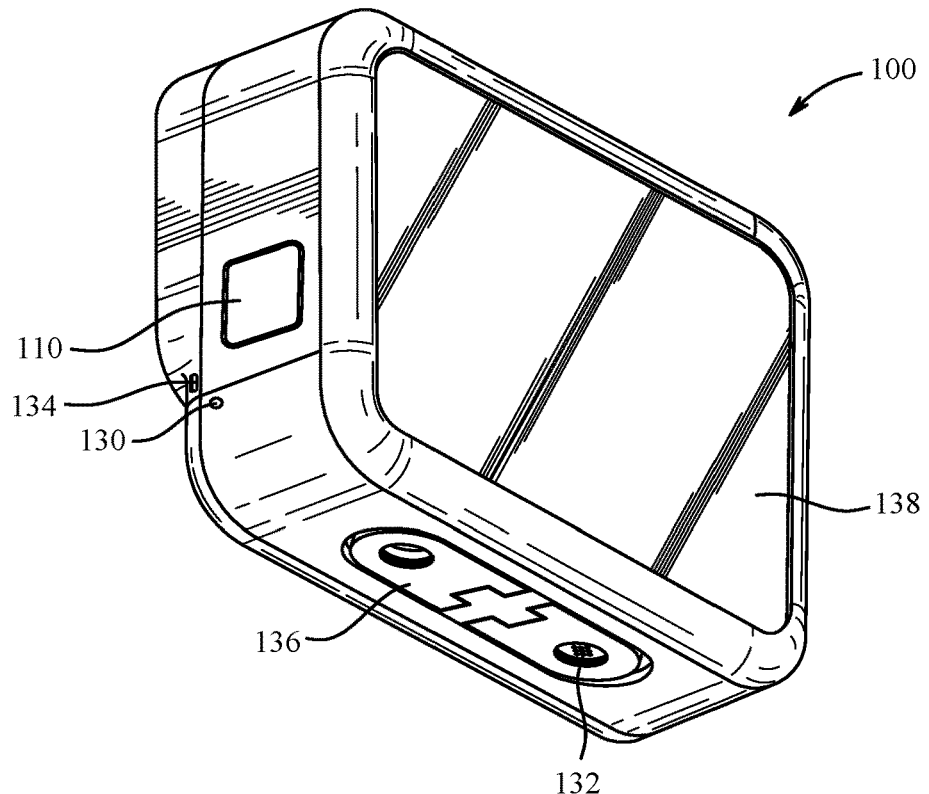

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
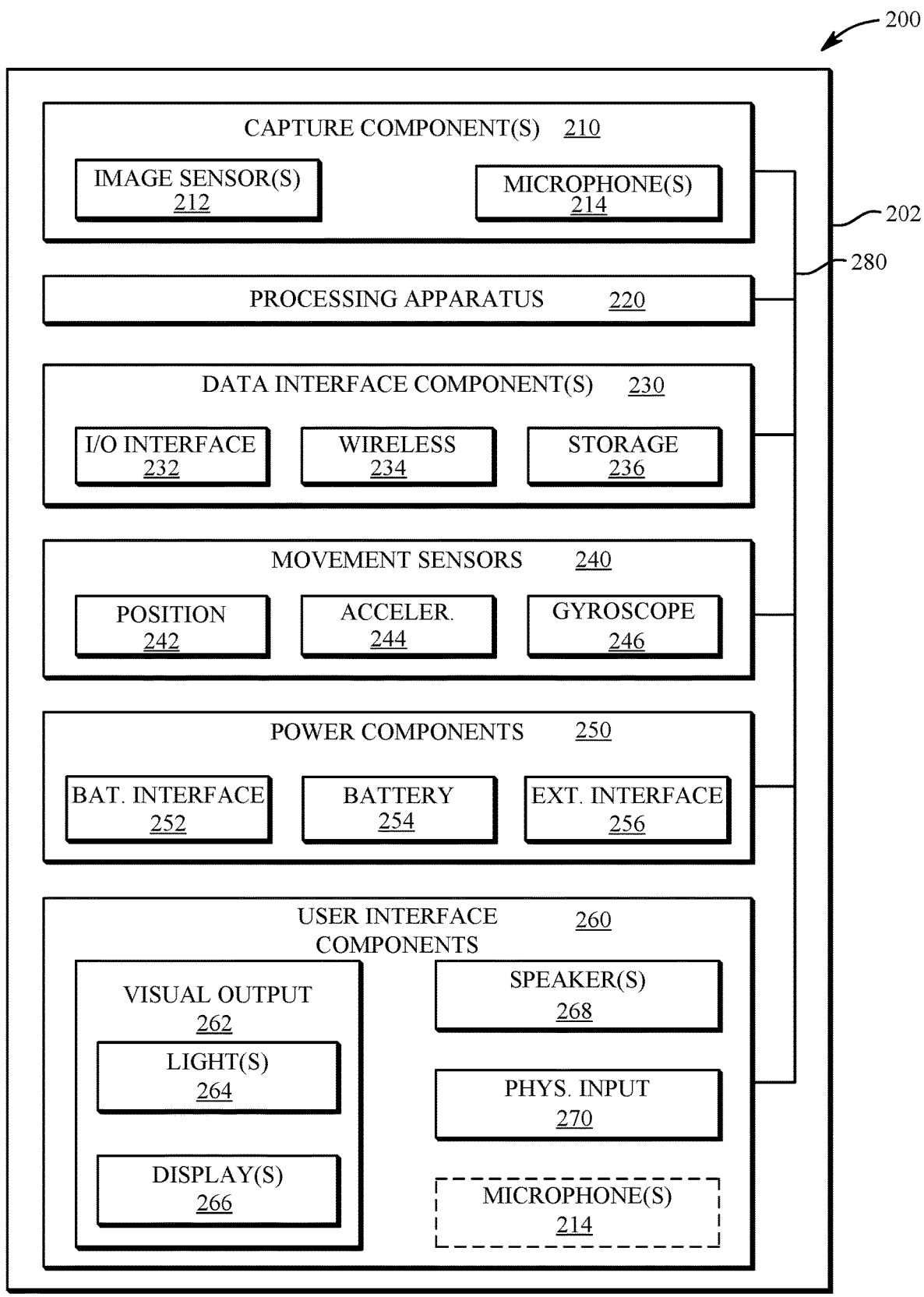
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor lens assemblies. The description of the image capture device 200 is also applicable to the image capture device 100 of FIGS. 1A-B.

The image capture device 200 includes a body 202 which includes electronic components such as capture components 210, a processing apparatus 220, data interface components 230, movement sensors 240, power components 250, and/or user interface components 260.

The capture components 210 include one or more image sensors 212 for capturing images and one or more microphones 214 for capturing audio.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 200 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include an external interface 256, and the power components 250 may, via the external interface 256, receive power from an external source, such as a wall plug or external battery, for operating the image capture device 200 and/or charging the battery 254 of the image capture device 200. In some implementations, the external interface 256 may be the I/O interface 232. In such an implementation, the I/O interface 232 may enable the power components 250 to receive power from an external source over a wired data interface component (e.g., a USB type-C cable).

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

Figure 3A:
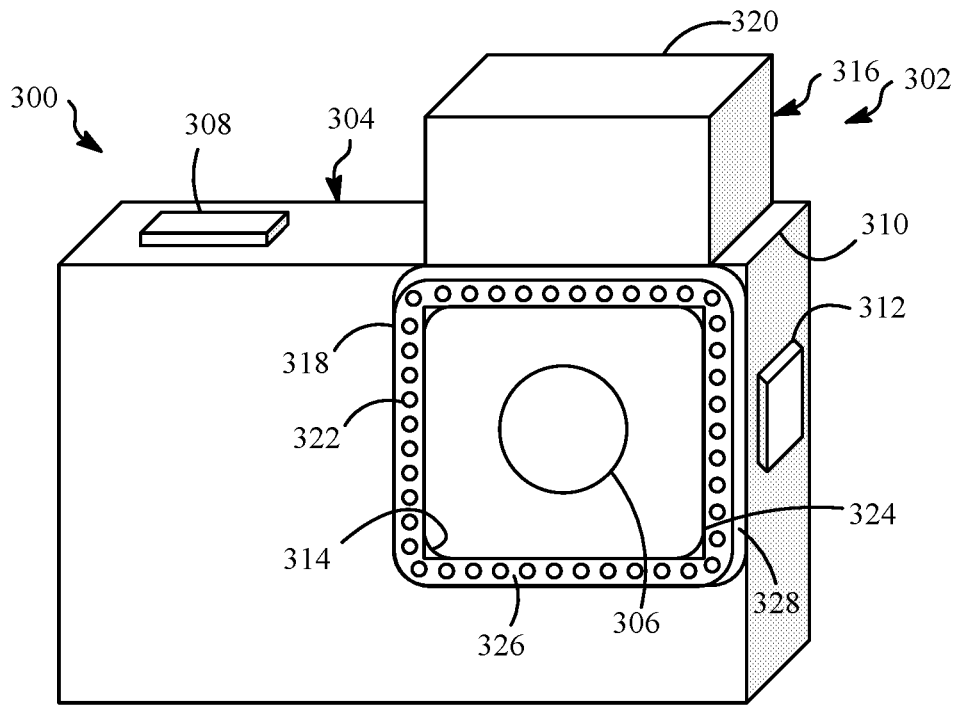
FIG. 3A is a perspective view an image capture device connected with a lens attachment.

FIG. 3A is a perspective view an image capture device 300 connected with a lens attachment 302, which may be similar to the image capture device 100 of FIGS. 1A and 1B or the image capture device 200 of FIG. 2. The image capture device 300 includes a housing 304 that may contain one or more other components that are not shown, such as imaging sensors, batteries, processors, GPS units, Bluetooth sensors, microphones, speakers, and/or heatsinks. Additionally, the image capture device 300 includes an imaging lens 306 that is connected with an imaging sensor (not shown), and the imaging lens 306 may be paired with one or more additional exterior lenses (not shown) that protect the imaging sensor and other internal components (not shown) from water and/or debris damage. In other configurations, the imaging lens 306 and the lens attachment 302 may be positioned at another location on the image capture device 300, such as at another corner so that the lens attachment 302 is attachable, such as rotatably attachable, to the housing 304.

A first actuation button 308 is positioned on a top of the housing 304 and is configured to be actuated when the user desires to begin detection of an image or video. The first actuation button 308 can be configured to be actuated to initiate detection of an image or video when the user desires. For example, actuation of the first actuation button 308 can cause initiation of a sequence that give the user a few moments to position his or herself before detection of the image and/or video. A second actuation button 312 is positioned on a side of the housing 304 so that the inner components (not shown), such as a removable battery or USB port, are easily accessible to the user. In other examples, the second actuation button 312 is configured to control the power or the mode of the image capture device 300. Additional actuation buttons (not shown) can be included as desired elsewhere on the housing 304, such as the opposing side, bottom, front, and/or back. The first and second actuation buttons 308, 312 can be positioned anywhere on the housing 304 such that the lens attachment 302 can freely move or rotate over or around an edge 310 of the image capture device 300 without physical obstruction by the first and/or second actuation buttons 308, 312. In this manner, image or video detection by the image capture device 300 is not interfered with by motion or use of the lens attachment 302. The first and/or second actuation buttons 308, 312 can have any configuration desirable by the skilled artisan, such as a touch, switch, and/or slide configurations.

The housing 304 provides a base for the lens attachment 302 so that the lens attachment 302 remains stable while an image and/or video is being detected. Because the lens attachment 302 is supported by the housing 304, the user does not need to worry about using multiple light fixtures that are difficult to position or keep still, such as where multiple lamps and/or spotlights are used around the room when the lens attachment 302 is not used for the light source. In other examples, the lens attachment 302 can rest on the side of the housing 304 adjacent to the second actuation button 312. In either case, the stability of the housing 304 and single location of the light source (i.e., peripherally or circumferentially around the imaging lens 306) provides an easy technique to control brightness, shading, and/or color of the detected images and/or videos.

When connecting the lens attachment 302 to the image capture device 300, the lens attachment 302 is interfaced with a bayonet 314 that is integrated with the housing 304 such that the lens attachment 302 is adjacent to the second actuation button 312 in an unsecured position (not shown). The lens attachment 302 can then be rotated from the side, over the edge 310, to the top surface and adjacent to the first actuation button 308 to secure the lens attachment over the bayonet 314 and the imaging lens 306 in a secured position (see FIG. 3A). In another example, the lens attachment 302 is interfaced with the bayonet 314 in an unsecured position at the side adjacent to the second actuation button 312 and then rotated from the top surface over the edge 310 to the secure position on the side adjacent to the second actuation button 312. The edge 310 may have any desirable configurations, such as a sharp edge (e.g., see FIG. 3A-3B), a rounded edge (e.g., FIGS. 1A-1B), a jagged edge (not shown), or any combination thereof.

The lens attachment 302 may be put into and released from a secured position by any means sufficient to retain a reliable connection between the lens attachment 302 and the housing 304. In some examples, a switch or button (not shown) is included to facilitate moving the lens attachment 302 from the secured position to the unsecured position. For example, the lens attachment 302 may be placed in the secured position once rotation over the bayonet initiates a clicking sound indicating that the lens attachment 302 is secured to the image capture device 300. Once secured, the lens attachment 302 may be released by simultaneously or sequentially pressing a button and rotating the lens attachment 302. In other examples, the lens attachment 302 may be pressed against or pulled from the housing 304 and rotated simultaneously to release the lens attachment 302 from the secured position. In other examples, no bayonet 314 is included in the housing 304, and the lens attachment 302 is connected via a threaded connection that requires a quarter turn or more to move into the secured position, which may be desirable for quicker interchangeability after a quick blogging session. In other examples, the lens attachment 302 is connected via a male-female connection that requires sliding to move into the secured position, which can use a clip to move between secured and unsecured position.

The connection between the lens attachment 302 and the bayonet 314 and/or housing may be watertight such that no moisture or water can reach the imaging lens 306 when the lens attachment 302 is in the secured position because the lens attachment 302 surrounds a periphery edge of the imaging lens. To make the watertight connection, a gasket(s) (not shown) may be included between the bayonet 314 and the lens attachment 302. Any feature may be added to the lens attachment 302 and/or the housing 304 to improve watertight capabilities. Where there is no watertight feature included in the lens attachment 302, an exterior lens (not shown) may be included with the housing 304 at or proximate to the bayonet 314, and the lens attachment 302 may simply secure over the exterior lens (not shown).

Figure 3B:
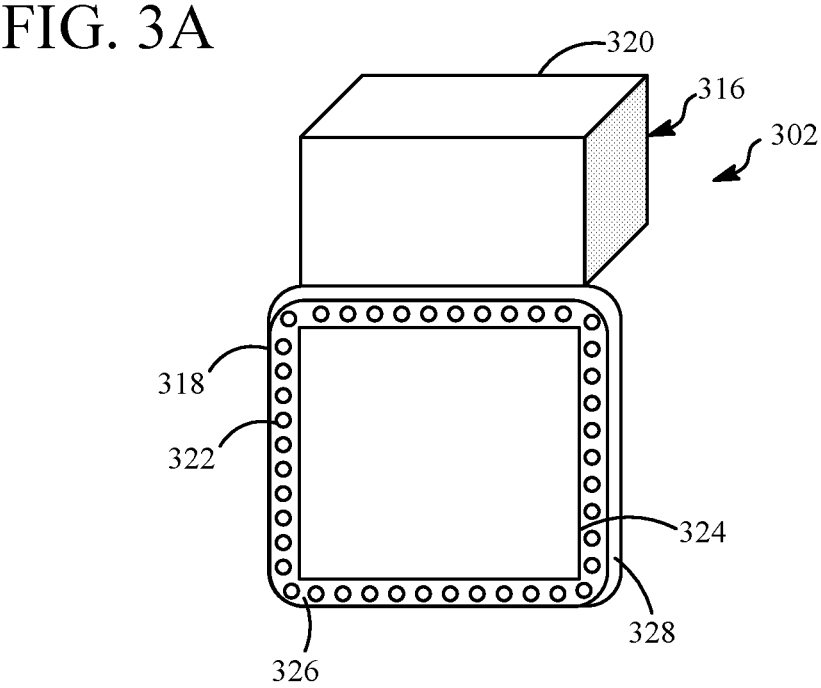
FIG. 3B is a perspective view of the lens attachment.

FIG. 3B is a perspective view of the lens attachment 302 of FIG. 3A. The image capture device 300 may appear the same or similar as the image capture device 100 of FIG. 1A when the lens attachment 302 is detached and another lens attachment (shown in FIG. 1A) is used. The lens attachment 302 includes a body 316 that is split between a ring light 318 and a storage unit 320. The ring light 318 and the storage unit 320 may be referred to as a first and second portion. The ring light 318 and the storage unit 320 may be detachable relative to each other so that a different configuration of a ring light 318 and a storage unit 320 may be used.

The ring light 318 includes a collection of lights 322 that are each individually controlled in a pattern so that the collection of lights 322 emit in a desirable fashion that is controlled by the user and/or a processor of the image capture device 300 or the storage unit 320. The ring light 318 and the storage unit 320 may be angled relative to each other such that the lens attachment 302 is connectable to the housing 304. The ring light 318 and the storage unit 320 may have any angle relative to each other such that the lens attachment 302 is connectable with the housing 304 and does not direct light into the imaging lens 306. As the lens attachment 302 rotates, the angle of the ring light 318 and the storage unit 320 may be chosen such that contact with or obstruction by the edge 310 is avoided. In some examples, the angle of the ring light 318 and the storage unit 42—may be adjustable so that the storage unit 320 avoids contact with or obstruction of the edge 310. For example, the storage unit 320 and the ring light 318 may have an angle that is about 60 degrees to about 180 degrees. The storage unit 320 and the ring light 318 may have an angle that is generally perpendicular. The storage unit 320 and the ring light 318 may have an angle that is generally flat.

The lens attachment 302 additionally includes an opening 324 that is designed to allow unobstructed detection of images and videos. The opening 324 may be configured as a connector that is integrate-able with the bayonet 314 so that the lens attachment 302 is rotatably removable from the housing 304. In some examples, the opening 324 includes a lens (not shown) that may be used to protect the imaging lens 306 from debris and/or water. The lens (not shown) may be any type of material sufficient to allow clear and unabated detection of images and/or videos through the imaging lens 306. In some examples, the lens (not shown) is distanced a predetermined space, for example 0.01 to 10 mm, away from the imaging lens 306 to improve the quality of the detected images and/or videos. In some examples, the lens (not shown) can improve the resolution and/or optical reception of light through the lens (not shown) via a zoom functionality or an ability to displace obstructions from the lens.

The storage unit 320 functions to contain electrical components that interact with components, such as the collection of lights 322, of the ring light 318. The storage unit 320 may include any component utilized to provide computing and/or electrical power, heat and/or cooling properties, and/or control to the ring light 318. For example, the storage unit 320 may include an input/output slot (not shown) for acquiring energy from an external source, and the external source may be the image capture device 300 and/or a power source that is separate from the image capture device 300. For connecting to the image capture device 300 to communicate with one or more features of the image capture device 300, the same or a different inlet/outlet slot may be utilized. An additional power source may include a battery (not shown) that is housable within the storage unit 320. In some examples, a Bluetooth component is used to connect with either the image capture device 300 or a computer (not shown) or phone (not shown) that is separate from the image capture device 300 so that the initiation of the ring light 318 may be controlled and/or the software is used to control the lights 322. In some examples, the lens attachment 302 may include software that is configured to be used for camera control, application control, integration with cameras detection modes, integration with the editing process and/or application creative suite.

Other components of the storage unit 320 may include a power button/switch (not shown) that is configured to initiate the ring light 318 or initiate a stand-by status of the lens attachment 302. A heatsink (not shown) may be included in the storage unit 320 which is configured to facilitate heat management between the ring light 318, a battery (not shown), a processor (not shown), or any combination thereof. The storage unit 320 may include any number of slots (not shown) or doors (not shown) so that one or more of the components contained within the storage unit 320 may be interchangeable.

The storage unit 320 may have any shape sufficient to support the ring light 318, orient the ring light 318 with respect to the imaging lens 306, and/or contain one or more of the components described herein. For example, the storage unit 320 may have a shape of a cylinder, a cube, a trapezoidal prism, a rectangular prism, a pyramid, or any combination thereof. The edges of the storage unit 320 may be sharp, round, or some combination of both depending on aesthetic desires. The underside of the storage unit 320 that is adjacent to the housing 304 of the image capture device 300 may have any shape or configuration sufficient to allow attachment adjacent to and/or rotation over or about the edge 310 of the image capture device 300. In some examples, the storage unit 320 may be semi-malleable (e.g., a compressible material) to facilitate movement about or rotation over the edge 310 while the lens attachment 302 is in a secure position. In other examples, the bottom of the storage unit 320 may include a material that is configured to have a friction fit with a top and/or a side of the housing 304.

The ring light 318 functions to emit light such that the image and/or video that is being detected by the image capture device 300 is illuminated in a desirable manner. The collection of lights 322 may have any light arrangement sufficient to provide desirable colors and brightness during detection of the videos and/or images. The ring light 318 may emit light in any direction that does not direct the lights 322 directly or indirectly into the imaging lens 306. One way to mitigate light being directed into the imaging lens 306 is to have the ring light 318 raised a perpendicular distance from the imaging lens 306 such that the emission point of the lights 322 is a distance laterally spaced from the imaging lens 306 and the housing 304 of the image capture device 300. For example, the emission point of the lights 322, which may be at an external surface 326 of the ring light 318, may be a perpendicular distance of about 1 mm to about 20 mm away from the housing 304 and/or imaging lens 306 when the ring light 308 is affixed to the imaging device 300. In other examples, the collection of lights 322 may emit light from a position on a side surface 328 of the ring light 318 (not shown) so that the collection of lights 322 have a pleasant aesthetic appeal that does not irritate the eyes a user facing the image capture device 300. The collection of lights 322 may be angled at any position relative to the external surface 326 and/or the side surface 328 that does not indirectly or directly emit light toward the imaging lens 306. For example, the lights 322 may be angled at about 5 degrees to about 175 degrees from a direction normal to the external surface 326 or the side surface 328. In some examples, the external surface 326 may include one or more walls (not shown) that are configured as light deflectors (not shown) so that the collections of light 322 do not directly or indirectly emit light into the imaging lens 306. For example, the external surface 326 may include an internal wall adjacent to the opening 324 and/or an external wall (not shown) adjacent to the side surface 328 so that light is directed away from the imaging lens 306 and towards the user.

The collection of lights 322 may have any color scheme that is sufficient to acquire desirable brightness and contrast in the images and/or videos. The emission color of each light in the collection of lights 322 may change depending on the pattern desired by the user, and the pattern of emission and/or color of emission may change during the detection of a video. For example, some lights in the collection of lights 322 may begin to emit "red" and "blue" to create a purple light on one side of a detected image while other lights emit "blue" and "green" to create a turquoise light on the other side of the detected image such that a desired pattern is achieved, and after a few moments of emission (e.g., 0.5 seconds to 3 seconds) the pattern may completely change to a different desired pattern without the user having to take any active measures during detection of the video.

Within the ring light 318, the lights 322 may emit in a pattern or sequence such that some lights in the collection of lights 322 are on and other lights in the collection of lights 322 are off to create a pattern which compliments the images and/or videos. For example, every other light or every third light may be on or off when the right light 318 is used in a room that has some natural light since this will create a desirable contrast in the image and/or video. In other examples, where the room is very dark, all of the lights in the collection of lights 322 may emit at the same time to provide maximum illumination of the user who is positioned in front of the imaging lens 306. The configuration in which certain lights in the collection of lights 322 are on or off may be designed to be in a specific pattern. The on and off pattern may be paired with emission of certain color schemes to give an aesthetically pleasing image and/or video for the user during a blog or the like. In other examples, the on and off pattern of the collection of lights 322 may alternate or change over time to create a pattern, such as a changing rainbow pattern or rotationally changing pattern.

The ring light 318 may include any number of lights in the collection of lights 322 sufficient to provide adequate image detection for the image capture device 300. The number of lights within the collection of lights 322 within the ring light 318 may be dependent on the size of the image capture device 300 and the properties of the imaging lens 306. For example, the ring light 318 may include about 2 to about 50 lights in the collection of lights 322 that are spaced in a specific arrangement around the imaging lens 306. One arrangement of lights in the collection of lights 322 may be to include lights in an even-numbered pattern around the opening 324 to present even contrast to the user during image and/or video detection. For example, one light may be positioned at all four corners of a ring light 318 that is rectangular or square, or one light may be positioned at all lateral sides of a ring light 318 that is rectangular or square. The light arrangement could be adapted to any shape whether even or odd such that desirable emission distribution is achieved by the collection of lights 322 along the ring light 318. In other examples, odd numbered patterns are used to help assist with the likely position of the image capture device 300 during use, such as when a user centers the imaging lens at his or her head but desires to illuminate features of the floor during image and/or video detection.

The ring light 318 may have any shape and/or arrangement sufficient to provide adequate emission using the collection of lights 322 for the user. The shape of the ring light 318 may be arranged to match the shape of the imaging lens 306 or the exterior lens (not shown) of the housing 304. For example, the ring light 318 may have a shape of an oval, a circle, a rectangle, a square, a triangle, a trapezoid, a pentagon, a hexagon, a heptagon, an octagon, or any other desirable shape. The edges of the ring light 318 may be sharp or rounded depending on the shape of the image capture device 300 and the arrangement of the lights in the collection of lights 322.

Within the ring light 318, the lights in the collection of lights 322 may be positioned on the external surface 326 or within the ring light 318. When the lights in the collection of lights 322 are positioned on the external surface 326, the lights may be angled in a particular manner to avoid emission into the imaging lens 306, as discussed herein. In some examples, the lights are positioned within the ring light 318, and the external surface 326, and optionally, the side surface 328, is configured as a lens or transparent surface such that light is emitted through the external surface 326 and optionally, through the side surface 328. In this configuration, the lights in the collection of lights 322 may be protected from external damage, such as through water, bumping, and debris, and the walls of the external surface 326, and optionally, the side surface 328, may deflect some emissions from the collection of lights 322 so that the imaging lens 306 is not negatively impacted by emissions.

Figure 4A:
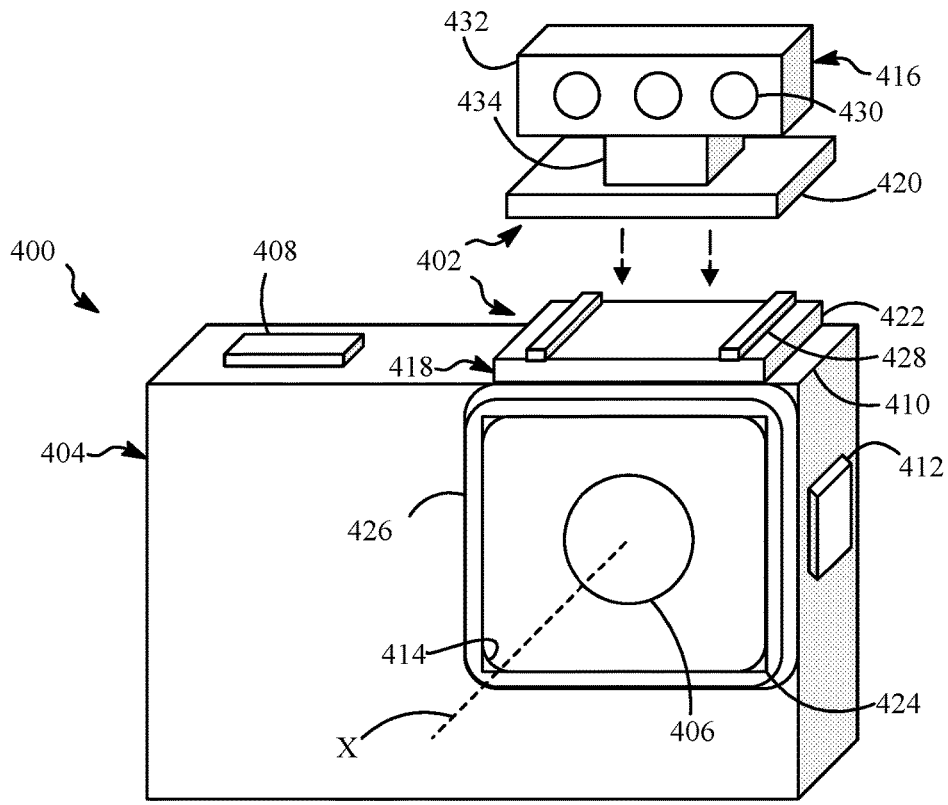
FIG. 4A is an exploded view of the image capture device connected with a lens attachment.
Figure 4B:
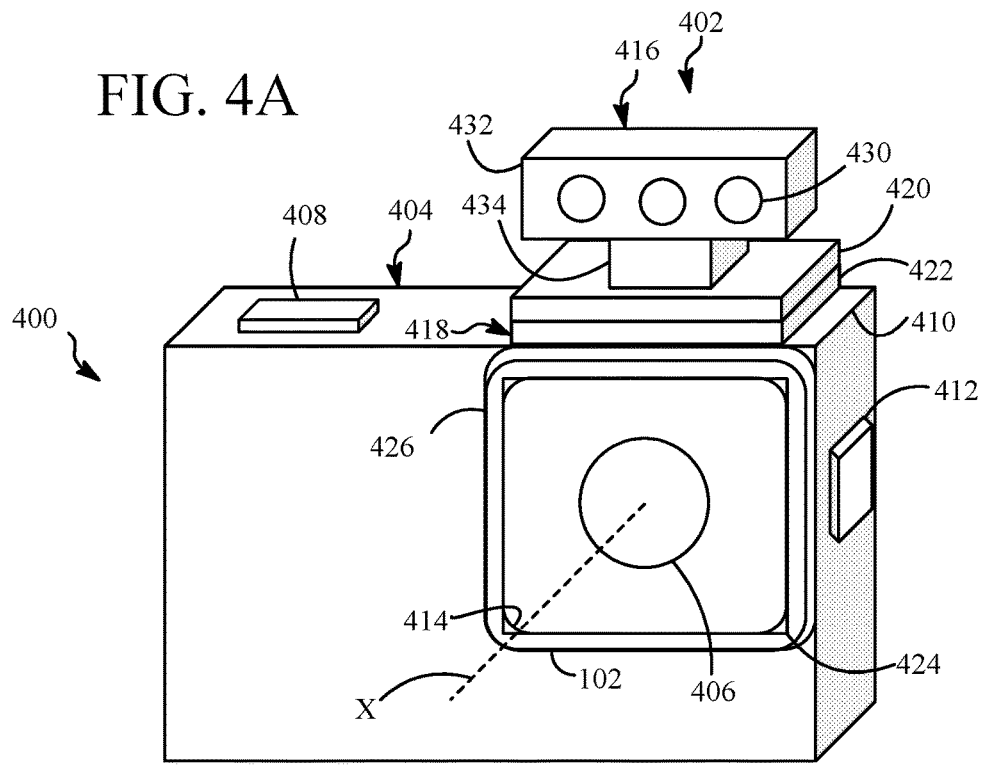
FIG. 4B is a perspective view of an image capture device connected with the lens attachment.

FIG. 4A is an exploded view of the image capture device 400 connected with a lens attachment 402. FIG. 4B is a perspective view of an image capture device 400 connected with the lens attachment 402. The image capture device 400 may be similar to the image capture devices 100, 200, 300 of FIGS. 1A-1B, 2, and 3A-3B. The image capture device 400 includes a housing 404 that supports the lens attachment, and the housing 404 includes an imaging lens 406 that is configured to receive and/or direct light into an imaging sensor (not shown) for detection of images. The housing 404 and/or the imaging lens 406 may be similar to the housing 304 and/or the imaging lens 306 of FIGS. 3A-3B. The housing 404 includes a first actuation button 408, an edge 410, a second actuation button 412, and a bayonet 414.

The lens attachment 402 is not electrically connected with the housing 404 at the bayonet 414, for example, the lens attachment 402 is configured as a "cold shoe." The lens attachment 402 includes a detachable light 416 and a lens body 418 that are releasably connectable to each other via a light support 420 and a rail support 422. The lens body 418 is disconnect-able from the bayonet 414, as described herein, and the detachable light 416 is disconnect-able from the lens body 418 and is free of direct connection with the housing 404. In some examples, the detachable light 416 may be attached to the lens body 418 when the lens body 418 is detached from the bayonet 414.

The detachable light 416 may be any component sufficient to connect with the lens body 418 that does not utilize an electrical connection with the lens body 418. By connecting at the bayonet 414, the lens attachment 402 can provide a disconnect-able platform that allows interchangeability of parts at the lens body 418 as the user desires, which increases functionality and characteristics of the images and videos detected by the image capture device 400 without having to alter other components or structure of the image capture device 400. For example, the detachable light 416 may instead be a microphone, a speaker, a lantern, a battery, or any combination thereof. In examples where a battery (not shown) is used in the detachable light 416, the lens body 418 may instead include lights (not shown) that are positioned around the lens 406.

In other examples, the detachable light 416 and the lens body 418 may not be releasably connected to simplify the components and reduce the chance of a wobbling effect at the connection means. In some examples, the detachable light 416 may include one or more connection features (not shown) that secure the detachable light 416 to the housing 404 so that the detachable light 416 has additional stability while detecting images and/or videos.

The detachable light 416 and the lens body 418 are releasably connected so that different detachable lights (not shown) may be used, such as detachable lights with different color, brightness, or light combinations. The detachable light 416 and the lens body 418 may be connected by any means sufficient to hold the detachable light 416 in a secure position (see FIG. 4B) proximate to the imaging lens 406. The detachable light 416 and the lens body 418 may be releasably connected by any means that will mitigate or prevent wobbling or shaking by the detachable light 416 when the user is attempting to detect a video or image with the image capture device 400. For example, connecting the detachable light 416 and the lens body 418 can be achieved by using a button (not shown) to release a clip functionality (not shown) that allows the detachable light 416 to be slid from the lens body 418. In other examples, the detachable light 416 and the lens body 418 may be connected by a sliding friction fit. By utilizing an efficient, releasable connection means, the user can replace the detachable light 416 with another light (not shown) that has different capabilities, such as different brightness, color, or pattern of emission.

The lens body 418 includes the rail support 422, an opening 424 proximate to the imaging lens 406, a frame 426 defining the opening 424, and rails 428 that are configured to interface with the light support 420. The frame 426 and the rail support 422 may be referred to as first and second portions. The frame 426 may be configured as a connector that is integrate-able with the bayonet 414 so that the lens attachment 402 is rotatably connectable with the housing 404. The rails 428 may have any configuration sufficient to support the light support 420 and may include additional securing means (not shown), such as clips or the like that releasably secure the light support 420. The rails 428 additionally have a purpose of aligning the detachable light 416 over the lens 406 such that light is emitted from the detachable light 416 in a direction that does not interfere with the imaging lens 406. For example, the rails 428 may be arranged relative to the detachable light 416 such that the detachable light 416 emits light in a direction that is parallel to an imaging axis X. In other examples, light is emitted in a direction that is angled relative to the imaging axis X.

The lens body 418 may be angled, such as at a junction between the frame 426 and the rail support 422, such that the lens attachment 402 is connectable to two sides (e.g., a top and a front) of the housing 404. The frame 426 and the rail support 422 may have any angle relative to each other such that the lens body 418 is connectable with the bayonet 424 and/or the detachable light 416 directs light into the lens 406. As the lens attachment 402 and/or the lens body 418 rotates, the angle of the frame 426 and the rail support 422 may be chosen such that contact with or obstruction by the edge 410 is avoided. In some examples, the angle or spacing between the frame 426 and the rail support 422 may be adjustable so that the rail support 422 avoids contact with or obstruction by the edge 410. For example, the frame 426 and the rail support 422 may have an angle of about 60 to about 120 degrees. The frame 426 and the rail support 422 may also have an angle that is generally perpendicular (as shown).

To control detection of the images, the first actuatable button 408 is positioned opposite of the edge 410 of the housing 404 relative to the lens attachment 402, and the second actuatable button 412 is positioned adjacent to the edge 410, but on a different wall than the first actuatable button 408. The second actuatable button 412 is configured to control the power of the image capture device 400. The first and second actuatable buttons 408, 412 may have any other functionality or configurations, as described in relation to the first and second actuatable buttons 308, 312 of FIGS. 3A-3B.

The lens attachment 402 may have similar rotational functionality about the edge 410 as the lens attachment 302 of FIGS. 3A-3B. For example, the lens attachment 402 interfaces with the bayonet 414, which may be similar to the bayonet 314 of FIG. 3A, when in an unsecured position and moves or rotates about or around the edge 410 to a secured position. The bayonet 414 may be referred to as a connector. Any other interface mechanism may be used in place of the bayonet 414 so long as the lens attachment 402 is securable on the housing 404. The secured position may be adjacent to either the first or second actuation buttons 408, 412 depending on the desired configuration of the first and second actuation buttons 408, 412 and the imaging lens 406. In other examples, the imaging lens 406 is positioned at a different corner of the housing 404, and the lens attachment is configured to rotate about another edge of the image capture device (not illustrated in FIGS. 4A-4B).

The opening 424 of the frame 426 may include an external lens (not shown) that is configured to protect the imaging lens 406 from debris and/or water. The frame 426 may be configured to have a watertight connection with the bayonet 414 and/or housing 404 such that no water interferes with the imaging lens 406 and/or imaging sensor (not shown) from the external environment. The frame 426 may have any shape and/or configuration sufficient to be secured to the housing 404 and/or bayonet 414. For example, the frame 426 may match the shape of the housing (not shown) for the imaging lens 406. In other examples, the frame 426 may have a shape of an oval, a circle, a rectangle, a square, a triangle, a trapezoid, a pentagon, a hexagon, a heptagon, an octagon, or any other desirable shape.

The detachable light 416 is configured to emit light in a direction that illuminates the location intended for the image and/or video and does not interfere with the imaging lens 406. The detachable light 416 includes lights 430 (or a single light (not shown)) that are the source of light emission. Any number of lights 430 may be included on the detachable light 416, such as between 1 and 50 lights 430. The size of the lights 430 may vary depending on the desired configuration. For examples, some lights 430 may be relatively small (not shown) and other lights 430 may be relatively large (not shown) on the same detachable light 416 so as to form a desired pattern. The lights 430 may be angled, colored, and/or patterned in a similar fashion as the collection of lights 322 of FIGS. 3A-3B. For examples, the lights 430 may be angled relative to the imaging axis X at an angle of about 45 degrees to about 135 degrees. Regarding colors, the lights 430 may have any color sufficient to detect a desirably illuminated image and/or video by the imaging sensor (not shown). For example, the lights 430 may have a configuration of white, red green blue, red green blue white, dual temperature white light, dual temperature red green blue white, or any combination thereof. Dual temperature lights may include warm lights and cool lights. For example, warm lights may have a temperature of about 2000 K to about 4800 K. For example cool light may have a temperature of about 4800 K to about 8000 K. The brightness, contrast, or color scheme of the lights 430 may be adjustable as described in relation to the collection of lights 322 of FIGS. 3A-3B.

The detachable light 416 includes a storage unit 432 that is connected with the light support 420 by a bridge 434. The storage unit 432 functions to support the lights 430 and may provide power to the lights 430. The lens attachment 402 receives power either from an internal power source (e.g., a battery within the body 418) or from an electrical cord extending to a wall or an inlet/outlet of the image capture device 400. The storage unit 432, the light support 420, and/or the bridge 434 may include any feature sufficient to provide power to the lights 430 when the lens attachment 402 is in the secured position on the housing 404. In other examples, the means to provide power to the lights 430 is a power source, such as an electrical cord and/or battery, that does not interface at the bayonet 414. The storage unit 432, the light support 420, and/or the bridge 434 may include any additional feature as described in relation to the storage unit 320 of FIGS. 3A-3B.

The bridge 434 may have any height and/or position such that light from the lights 430 is emitted in a direction that does not interfere with the imaging lens 406. When the bridge 434 is not included, the storage unit 432 directly connects with the light support in order to simplify components and/or to further stabilize the lights 430 on the storage unit 432. In some examples, the bridge 434 and the light support 420 are not included in the detachable light 416, and the storage unit 432 directly connects with the rail supports in order to change the location of light emission relative to the imaging lens 406.

Figure 5A:
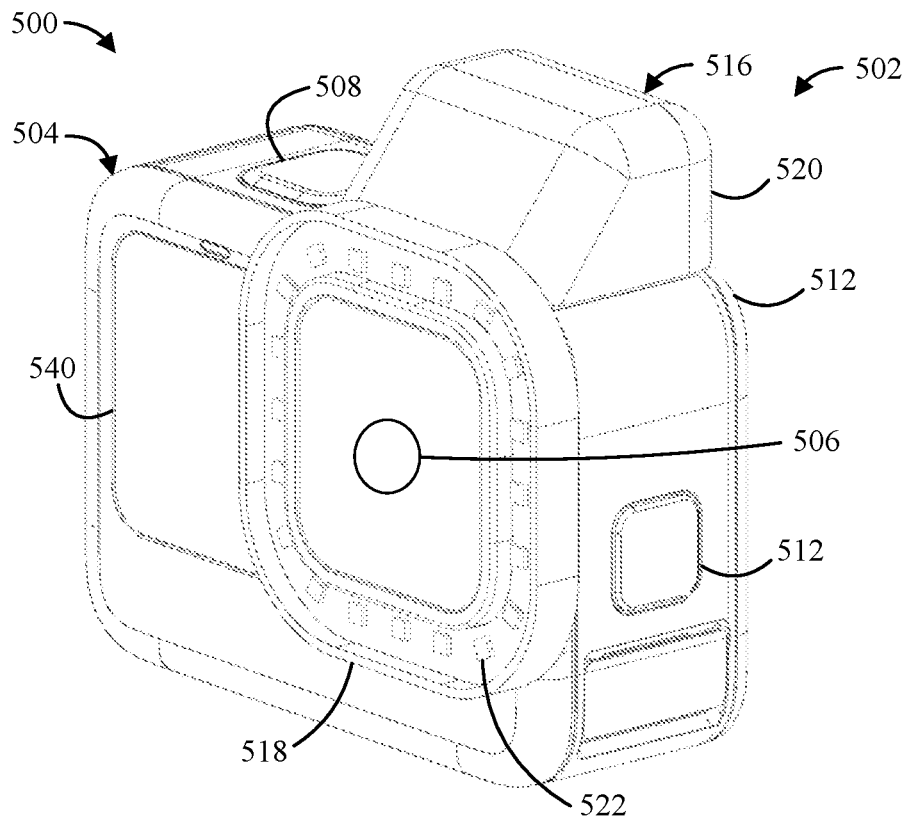
FIG. 5A is a perspective view of an image capture device connected with a lens attachment.
Figure 5B:
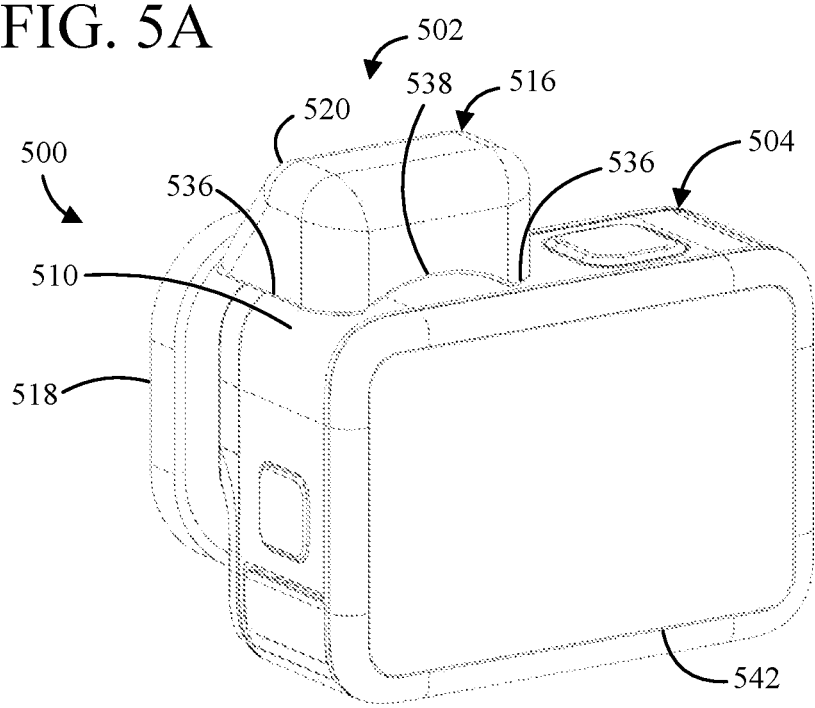
FIG. 5B is a perspective view of the image capture device connected with the lens attachment.

FIG. 5A is a front-side perspective view of an image capture device 500 connected with a lens attachment 502. FIG. 5B is a rear-side perspective view of the image capture device 500 connected with the lens attachment 502. The image capture device 500 includes a housing 504 that has a lens 506 for protecting an image sensor (not show) and a first actuation button 508 on a top surface adjacent to the lens attachment 502. An edge 510 that is curved separates a second actuation button 512 from the first actuation button 508. The housing 504, the lens 506, the first actuation button 508, and the second actuation button 512 may be similar to the housings 304, 404, the lenses 304, 404, the first actuation buttons 308, 408, and the second actuation buttons 312, 412 of FIGS. 3A-4B.

The lens attachment 502 includes a body 516 that is split between a ring light 518 and a storage unit 520 that are generally perpendicular relative to each other. The lens attachment 502, the body 516, the ring light 518, and the storage unit 520 may be similar to the lens attachments 302, 402, the bodies 316, 416, the ring lights 318, 418, and the storage units 320, 420 of FIGS. 3A-4B. The ring light 518 includes lights 522 that are configured to emit such that a pattern of lights are shown in the detected image and undesirable shadows are avoided, and the lights 522 may be similar or have similar functions and/or configurations as the lights 322, 430 of FIGS. 3A-4B.

The lens attachment 502 is configured to connect with the image capture device 500 by rotating across or about the edge 510 and connecting with one or more connection features (not shown) adjacent to lens 506. For example, a bayonet (e.g., the bayonet 314, 414 of FIGS. 3A and 4A-4B) may be used to secure the lens attachment 502 against the housing 504. The storage unit 520 includes a flat edge 536 and an indented edge 538 so that the lens attachment 502 can easily rotate about the edge 510 of the housing 502. The flat edge 536 and/or the indented edge 538 may have any shape or configuration sufficient to rotate around the edge 510 of the house during a connection and disconnection process. The flat edge 536 and/or the indented edge 538 may be smooth to assist with rotating across the edge 510. The flat edge and/or the indented edge 538 may include a material that sticks or has a friction fit with the housing 504 so that the lens attachment 502 remains connected unless rotated across the edge 510 with a predetermined force. In some examples, the flat edge 536, the indented edge 538, and the edge 510 may include one or more attachment features, such as a clip (not shown), that improves the connection and disconnection of the lens attachment 502 and the image capture device 500.

The housing 504 includes screens 540, 542 that are configured such that a user can see a predicted image on the screens 540, 542 before the image or video is detected. The screens 540, 542 may show a predicted pattern of lights, as described herein, such that a face of a person may have a distinct color or pattern of light on one side of his or her face and a different, distinct or color or pattern of light on another. The screens 540, 542 may show a prediction of the detectable image such that the user can identify the predicted image with or without the ring light 518 that is configured to emit light. The screens 540, 542 may additionally be implemented with the image capture devices 300, 400 of FIGS. 3A and 4A-4B.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A lens attachment, comprising:
 a body configured to overlay a lens of an image capture device, comprising:
  a lens body that has inner and outer surfaces, the inner surface configured to overlay or abut a lens surface of a housing of the image capture device; and
  a storage unit that extends from the inner surface of the lens body at an angle that is substantially perpendicular such that the storage unit is configured to extend along a first or a second lateral surface of the housing;
 one or more lights integrated with the outer surface of the lens body and configured to emit light in a direction so that the light is not directed into the lens of the image capture device, the one or more lights slidably connected with the body of the lens attachment so that a different collection of lights is interchangeable with the one or more lights; and
 a connector integrated with one or more of the inner surfaces of the lens body and configured to rotatably secure the lens attachment against the lens and the housing of the image capture device by rotating the storage unit relative to the lens surface and between the first and the second lateral surfaces of the housing.
2. The lens attachment of claim 1, wherein individual lights in the collection of lights are configured to emit in a predetermined pattern, so that at least one of shadows are avoided when light is detected by an imaging sensor of the image capture device, or color effects highlight portions of a face of a person in the predetermined pattern.

3. The lens attachment of claim 1, wherein the one or more lights are configured to emit a light beam at an angle of about 15 degrees to about 180 degrees relative to an imaging axis of the lens of the image capture device so that shadows are avoided when light is detected by an imaging sensor of the image capture device.

4. The lens attachment of claim 1, wherein the one or more lights comprise one or more light directors that are configured to direct light in a controlled direction so that at least one of shadows are avoided when light is detected by an imaging sensor of the image capture device or distinct color separation is shown on a face of a person.

5. The lens attachment of claim 1, wherein the storage unit comprises a battery that is configured to provide power to the one or more lights.

6. An image capture system comprising the lens attachment of claim 1, further comprising:
an image capture device including a lens, a housing with a lens surface and a plurality of lateral surfaces, and a bayonet surround the lens,
wherein the connector is configured to rotatably connect to the bayonet that surrounds the lens of the image capture device.

7. The image capture system of claim 6, wherein the connector is configured to friction fit or clip with the lens of the image capture device such that the lens body encloses the lens attachment against the lens surface of the housing of the image capture device.

8. The lens attachment of claim 1, wherein the one or more lights have a structure of a ring light that is positioned to surround a peripheral edge of the lens of the image capture device when the lens attachment is secured to the housing of the image capture device.

9. The lens attachment of claim 8, further comprising:
an external lens that is integrated with the body and configured to overlay the lens of the image capture device.

10. A lens attachment, comprising:
a body comprising:
a first portion having inner and outer surfaces, the inner surface comprising a connector configured to rotatably connect with a lens of an image capture device such that the body connects with the image capture device by rotating relative to a lens surface of a housing of the image capture device; and
a second portion that extends from the inner surface of the first portion at an angle that is substantially perpendicular relative to the inner surface, the second portion comprising:
a flat portion configured to abut at least one surface of a lens; and
an indented portion configured to rotate across an edge that separates the first and second lens surface;
a secondary lens integrated with at least one of the inner or outer surfaces of the first portion; and
a plurality of lights arranged around a periphery of the lens and configured to emit light in a direction away from the secondary lens at an angle of about 5 to about 175 degrees.

11. The lens attachment of claim 10, further comprising:
a battery integrated with the second portion of the body; or
an outlet configured to provide power to the lens attachment from an image capture device or an external power source through the second portion of the body.

12. The lens attachment of claim 10, wherein the plurality of lights are configured to emit to a location that faces the lens of the image capture device.

13. The lens attachment of claim 10, the second portion further comprising at least one of a controller, a GPS unit, or a Bluetooth interface, WiFi unit.

14. The lens attachment of claim 10, wherein the connector is configured to rotatably connect the lens attachment with a bayonet of the image capture device so that the secondary lens overlays the lens of the image capture device, the inner surface overlays the lens surface, the indented portion allows rotation across the edge, and the flat portion abuts the first or second lateral surfaces.

15. The lens attachment of claim 14, wherein the second portion is configured to rotate at the connector with respect to a lens surface, around an edge of the image capture device, and between the first and second lateral surfaces of the housing.

16. An image camera device, comprising:
a housing comprising:
at least one edge separating first and second side surfaces that are substantially perpendicular; and
a lens surface that contacts the first and second side surfaces and the at least one edge;
a bayonet integrated with the lens surface of the housing;
a lens positioned within the bayonet that facilitates light to an imaging sensor; and
a lens attachment that overlays the lens and the housing, the lens attachment comprising:
a lens body that overlays the lens surface, comprising:
a collection of lights that emit light in a direction that does not cause the light to enter the imaging sensor; and
a connector configured to secure the lens attachment with the bayonet; and
a storage unit that overlays one of the first or second side surfaces and extends at an angle that is substantially perpendicular to the lens body, the storage unit comprising an internal component configured to interact with the collection of lights.

17. The image capture device of claim 16, wherein the connector has a rotatable connection with the bayonet or a snap-fit with the bayonet.

18. The image capture device of claim 17, wherein the lens body extends across the lens surface of the housing and the storage unit extends across the first or second side surfaces of the housing, and wherein the storage unit is rotatable over the at least one edge and between the first and second side surfaces.

19. The image capture device of claim 18, wherein the storage unit comprises a battery, a controller, a GPS unit, a Bluetooth interface, WiFi unit, or any combination thereof.

20. The image capture device of claim 18, wherein the storage unit is removable from the lens body.

* * * * *